United States Patent

Kwon

[11] Patent Number: 5,967,924
[45] Date of Patent: Oct. 19, 1999

[54] SPROCKET BUFFER FOR CHAIN DRIVING SYSTEM

[75] Inventor: Yi Sug Kwon, Kyongsangnam-Do, Rep. of Korea

[73] Assignee: LG Industrial Systems, Co., Ltd., Seoul, Rep. of Korea

[21] Appl. No.: 08/956,389

[22] Filed: Oct. 23, 1997

[30] Foreign Application Priority Data

Oct. 23, 1996 [KR] Rep. of Korea ............ P96-47646

[51] Int. Cl.$^6$ ............ F16H 55/06; F16H 55/12
[52] U.S. Cl. ............ 474/161; 474/162
[58] Field of Search ............ 474/152, 161, 474/162, 163, 151

[56] References Cited

U.S. PATENT DOCUMENTS

| | | | |
|---|---|---|---|
| 3,504,562 | 4/1970 | Hirych | 474/161 |
| 3,916,708 | 11/1975 | Durand | 474/163 |
| 4,031,769 | 6/1977 | Kassing | 474/162 |
| 4,058,352 | 11/1977 | Sogge | 474/163 |
| 4,472,164 | 9/1984 | Pusch et al. | 474/161 |
| 4,752,281 | 6/1988 | Lammers | 474/162 |
| 5,203,861 | 4/1993 | Irwin et al. | 474/162 |

*Primary Examiner*—Thomas R. Hannon
*Assistant Examiner*—Matthew A. Kaness
*Attorney, Agent, or Firm*—Birch, Stewart, Kolasch & Birch, LLP

[57] ABSTRACT

In a sprocket buffer, in order to reduce a noise and a shake/vibration of the chain gearing mechanism, an elastic band is provided to be adhered in a bottom of the sprockets; a cylindric pin which is to be inserted into the coupling hole in the bottom of the sprockets is formed in a lower part of the elastic band, and a pressure portion having the same diameter as that of the coupling hole is formed integrally with the cylindrical pin at a lower portion of the outer peripheral surface of the pin, thereby improving a durability against a cut off of the pin head portion.

9 Claims, 4 Drawing Sheets

1a, 1b

SPROCKET BUFFER FOR CHAIN DRIVING SYSTEM

BACKGROUND OF THE INVENTION

1. Field of the Invention

The present invention relates to a buffer attached to a bottom of a sprocket to decrease a noise and a shake/vibration occurring in a chain driving system, and more particularly, relates to a sprocket buffer for a chain gearing mechanism wherein a pin portion to be inserted to a coupling hole of a sprocket is improved so as not to be cut off, the sprocket buffer being an elastic band type that is positioned to adhere closely along a surface of a sprocket bottom.

2. Description of the Prior Art

As shown in FIG. 1, a conventional chain gearing mechanism comprises a driving sprocket 1a, a driven sprocket 1b and a chain 2 to connect the sprockets, wherein the driving sprocket 1a rotates the driven sprocket 1b by transferring power through the chain 2. The conventional chain gearing mechanism has a merit that significant power can be transferred by maintaining a constant speed ratio, whereas it has a problem that a noise and a shake/vibration are terrible. Since metal to metal surfaces are facing each other, such a structure continuously produces noise, shake and vibration. Specifically, in a case when chains and sprockets are worn according to increased use, the noise is more loudly produced because of unfit engagement.

In order to solve and improve the problem of the conventional chain gearing mechanism, there has been provided a pin type buffer 4 which is inserted in a coupling hole 3a formed on the tooth bottom surface of a sprocket, as shown in FIG. 2. When the pin type buffer 4 is inserted in the coupling hole 3a, a head 21 of the buffer is kept upwardly projected by about 2–3 mm from a bottom 3 of the sprocket. Further, when the sprockets 1a, 1b are connected to a chain roller 6, the pin type buffer 4 performs the role of buffering such that the chain roller 6 and sprockets 1a, 1b do not directly collide with the pin head 21 being pressed by the chain roller 6. However, the conventional chain gearing mechanism may result in an inaccurate engagement caused by a non-straight or a misalignment of the sprockets 1a, 1b and the chain 2 due to an outer and inner circumstances, to an error occurrence in a pitch, and/or to other error occurrences due to a wearing-out of the chain 2 and sprockets 1a, 1b. As illustrated in FIG. 3, in a chain driving, if the chain roller 6 changes a phase status to a portion B rather than a portion A located at a front center of the bottom 3 of the sprockets 1a, 1b, the pin type buffer 4 is biased to the portion B, thereby causing louder noise, shake, and vibration.

Accordingly, the conventional chain gearing mechanism has a problem of noise and shake/vibration caused during the process that the sprockets 1a, 1b are engaged with the chain 2 due to a fact that all the materials are metal, and furthermore, such problem still exists in the case where the pin type buffer 4 is provided to reduce the noise, shake and vibration.

When the pin type buffer 4 is junctioned to the bottom 3 of the sprockets 1a, 1b, even if the chain roller 6 starts to be junctioned at the portion A, which is an accurate engagement position, it collides against the bottom 3 around the portion B after first making contact with the pin type buffer 4, thereby generating a noise and a shake/vibration of the collision. Furthermore, the occurrences of a non-straight or a misalignment of the sprocket 1a, 1b and the chain 2 due to general outer and inner circumstances, to errors by the pitch, and/or to an old chain 2 and old sprockets 1a, 1b, will result in an inaccurate engagement of the chain roller 6 with the bottom 3 of the sprockets 1a, 1b. In this event, as a collision starts not from the buffer 4 where the chain roller 6 is connected to the bottom 3 of the sprockets 1a, 1b but from the bottom 3 of other portions, there is no effect of reducing the noise and the shake/vibration caused by the collision. Rather, in a case where a large compressive force is received from the chain roller 6, the pin type buffer 4 is compressed to be inserted into the coupling hole 3a and therefore, makes contact with the chain roller 6 and the bottom 3 of the sprockets 1a, 1b, thereby generating the noise and the shake/vibration of the collision.

To solve the above-indicated problems, as illustrated in FIG. 4, there has been provided a band-type buffer 5 to buffer an impact throughout a whole bottom 3, comprising an elastic band 10 to cover the whole bottom 3 of the sprockets 1a, 1b; a cylindrical pin 20 for being fixedly inserted into a coupling hole 3a formed in the bottom 3, which is coupled with a lower part of the elastic band 10; and a reinforcement rim 30 formed in one body on an outer peripheral surface of the pin 20 in the lower end of a pin head 21 to support the portion where the elastic band 10 and the pin 20 are coupled, the pin head 21 being upwardly projected as long as a determined length.

However, the band-type buffer 5, wherein the reinforcement rim 30 corresponding to a neck portion of the pin is adhesively inserted into the coupling hole 3a, has a defect that a life of the buffer is short because the elastic band 10 and the pin 20 are cut off by a repeated application of shear force toward the neck portion of the pin if the chain roller 6 is biased in any one direction upon a chain driving.

Accordingly, an object of the present invention is to solve the problems by providing a sprocket buffer for a chain gearing mechanism that extends the buffer's life by preventing any cut-offs which may occur by a shear force applied to the neck portion of the pin when making contact with the chain roller.

SUMMARY OF THE INVENTION

A sprocket buffer for a chain gearing mechanism according to this invention to achieve the above-suggested object comprises an elastic band form to be closely adhesive to a bottom of the sprockets; a cylindrical pin for being inserted into a coupling hole in the bottom of the sprockets in a lower part of the elastic band; and a pressure portion having the same diameter as one of the coupling holes and being formed integrally with a lower outer peripheral surface of the pin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 6:
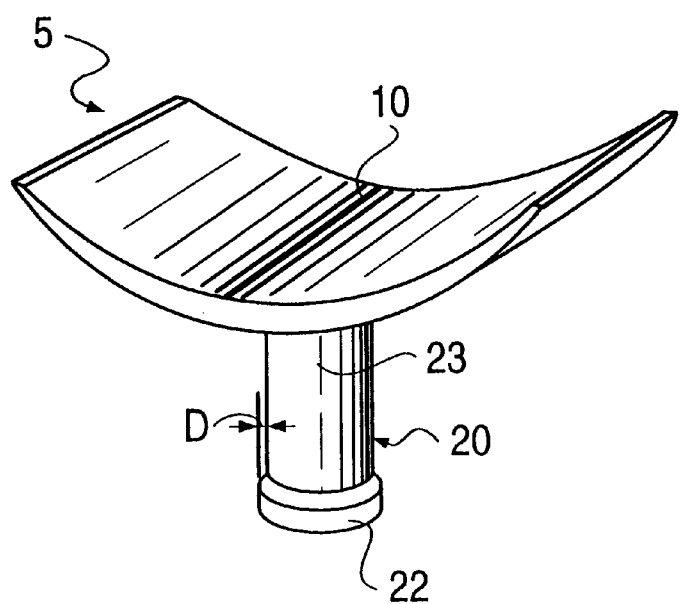
FIG. 6 is a perspective view of a band-type sprocket buffer according to the invention.

As shown in FIG. 6, in a sprocket buffer for a chain gearing mechanism in accordance with the invention, an elastic band 10 is provided to be adhered to a bottom 3 of sprockets 1a, 1b; a cylindrical pin 20 for being inserted into a coupling hole 3a of the bottom 3 of the sprockets 1a, 1b is formed in a lower part of the elastic band 10; and a pressure portion 22 having the same diameter as one of the coupling hole 3a is formed integrally with a lower outer peripheral surface of the pin 20.

A preferable width of the elastic band 10 is the same as or less than a thickness of the sprockets 1a, 1b; a preferable length thereof is long enough to cover a whole bottom 3 of the sprockets 1a, 1b; and a preferable thickness is that it is thicker toward its center and crescent in shape.

Further, a diameter of the pin 20 is formed as large as possible in consideration of the thickness of the sprockets 1a, 1b, provided that it must be smaller than the diameter of the coupling hole 3a so that a clearance can be formed around the pin 20. The pressure portion 22 is formed to be identical with the inner diameter of the coupling hole 3a which is to be adhesively inserted into the coupling hole 3a.

Figure 7A:
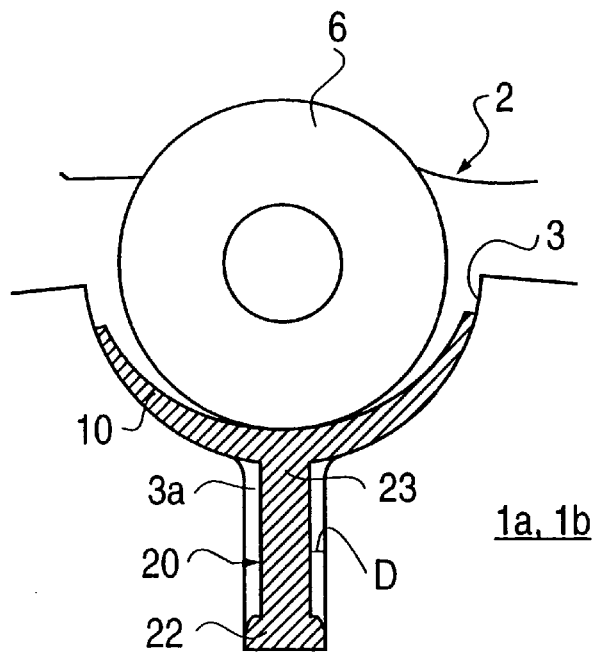
FIGS. 7A and 7B are detailed views for explaining a combined mechanism of a chain roller and a sprocket, into which a conventional pin type buffer is inserted according to the present invention.
Figure 7B:
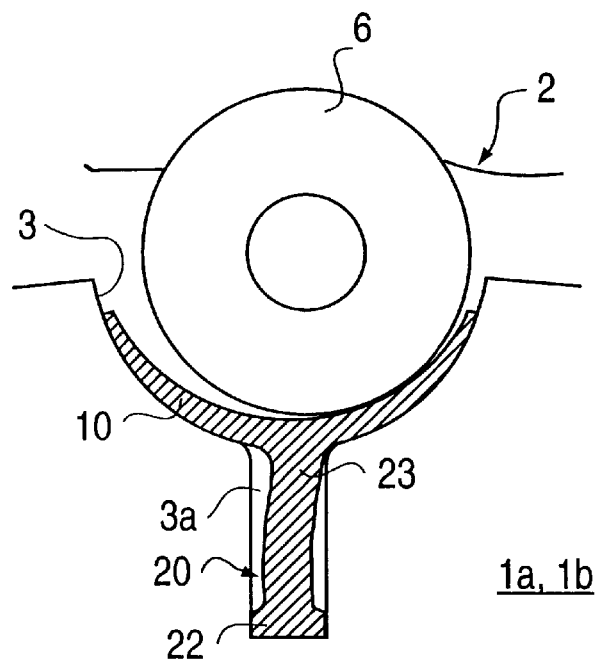

Particularly, sequences of an operational mechanism of a chain driving will be described with reference to FIGS. 7a and 7b. As illustrated in FIG. 7a, before the chain driving starts, the chain roller 6 is positioned on a front center and therefore, an impact force is dispersed and is received to be evenly transferred to the buffer 5. However, as illustrated in FIG. 7b, upon the chain driving, since the chain roller 6 pulls the elastic band 10 by being biased in one direction against the driving direction of the driving sprocket 1a, a shear force concentratedly acts on the next portion 23 of the pin. At this point, a clearance D is formed between the pin 20 and an inner peripheral surface of the coupling hole 3a so that the neck portion 23 of the pin is flexibly curved, thereby effectively buffering and absorbing the impact transferred to the buffer 5.

Figure 1B:
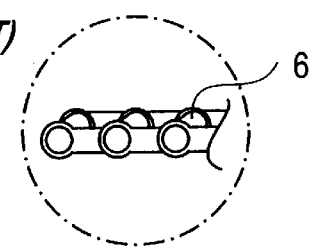
FIG. 1 is a front view of a sprocket buffer for a chain gearing mechanism according to a conventional technology.
Figure 1A:
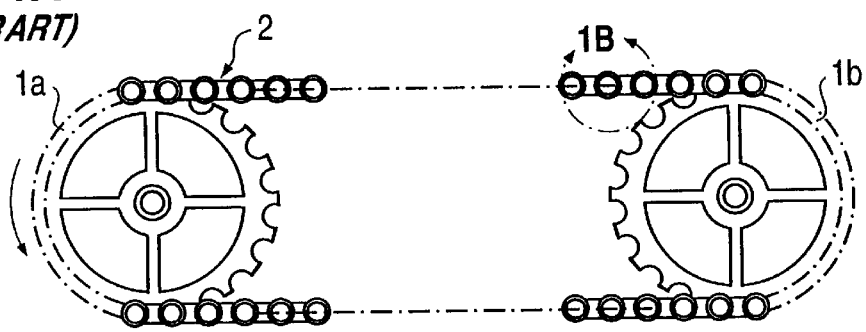
Figure 2C:
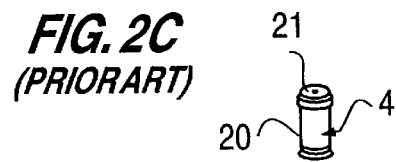
FIG. 2 is a partially enlarged view illustrating a condition where a conventional pin type buffer is inserted into a general sprocket.
Figure 2A:
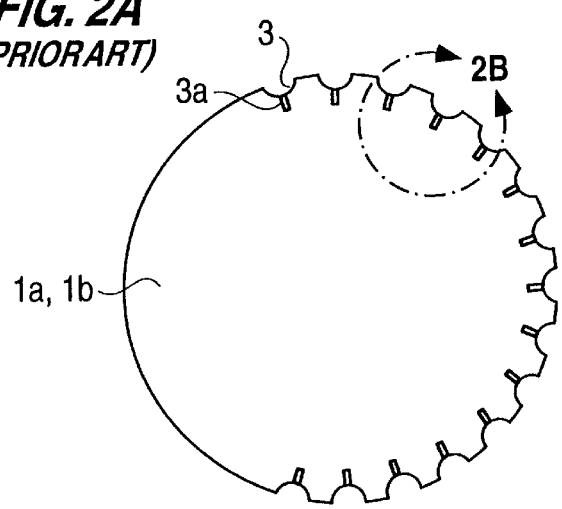
Figure 2B:
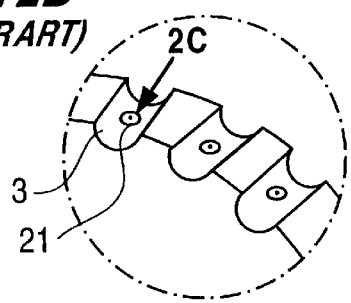
Figure 3:
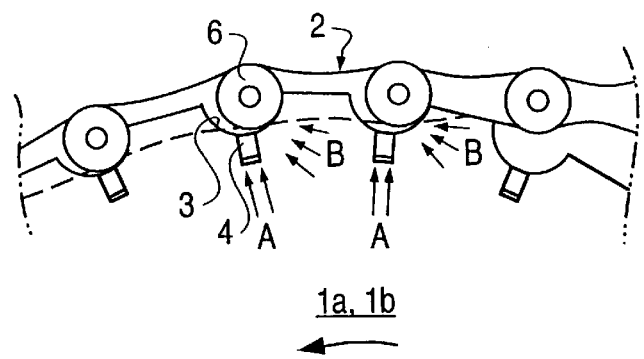
FIG. 3 is a partial detailed view for explaining a combined mechanism of a chain roller and a sprocket, into which a conventional pin type buffer is inserted.
Figure 4A:
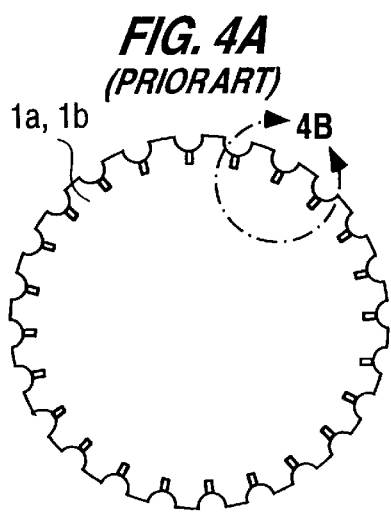
FIG. 4 is a partial enlarged view illustrating a condition where a conventional band-type buffer is inserted into a general sprocket.
Figure 4B:
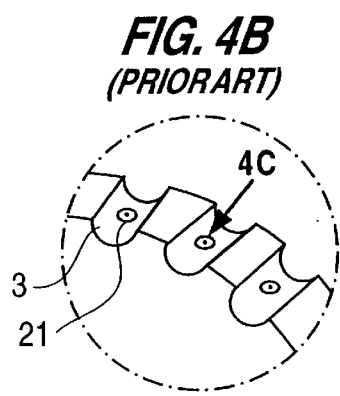
Figure 4C:
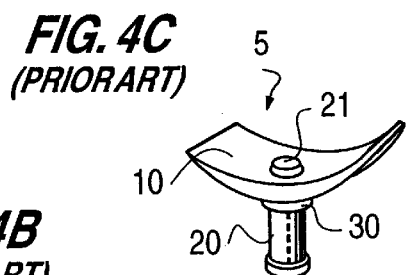
Figure 5:
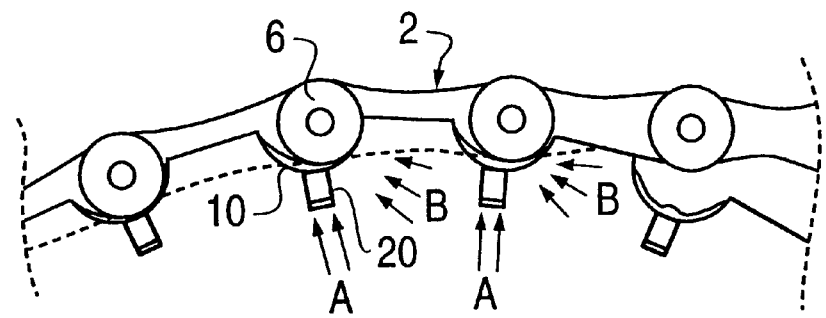
FIG. 5 is partial detailed view for explaining a combined mechanism of a chain roller and a sprocket, into which a conventional pin type buffer is inserted.

Therefore, in a chain gearing mechanism according to the invention, if a driving sprocket 1a drives by a driving source, the driving sprocket 1a is coupled with a chain 2, and a power is transferred through the chain 2 to a driven sprocket 1b, as shown in FIG. 1. Further, as shown in FIGS. 7a and 7b, when a chain roller 6 engages with a bottom 3 of the sprockets 1a, 1b according to the invention, even if an engagement phase is changed by an inaccurate engagement and thus, a contact occurs earlier at a portion B than at a portion A, no collision between the metals occurs because an elastic band 10 of the band-type buffer 5 entirely covers the bottom 3 of the sprockets 1a, 1b. Consequentially, this significantly reduces the noise and the shake/vibration of a direct collision of the chain roller 6 with the bottom 3 of the sprockets.

Namely, as a result of measuring and comparing noise levels of the chain gearing mechanism which applies the band-type buffer 5 in accordance with the present invention and the chain gearing mechanism in accordance with the conventional technology, it was discovered that the present invention efficiently reduces the noise by about 5 dB.

Therefore, this invention having the above disclosed technical constitution and procedure obtains the follows effect:

The sprocket buffer of the chain gearing mechanism according to the invention, which is coupled with the bottom 3 of the sprockets 1a, 1b, enables an absorption of the noise and the shake/vibration of the collision of the chain roller 6 with the bottom 3 of the sprockets.

Accordingly, one of the merits of the invention, which buffers any impact which may occur because of a non-straight or a misplacement of the sprockets 1a, 1b and the chain 2, an error of pitch, and/or an aging of the chain 2 and the sprockets 1a, 1b, is that it reduces the noise and the shake/vibration even in an incomplete engagement where the chain roller 6 is biased from a front center of the bottom 3 of the sprockets 1a, 1b. In addition, an other merit is that the invention extends a life of the buffer 5 to maximum by forming a clearance D in the coupling hole 3a wherein the neck portion 23 of the pin, which is the most weak portion with respect to a shear force, is able to flexibly move to meet any condition of the chain driving so that the buffer 5 effectively absorbs an outer force.

In addition, while the foregoing sets forth a preferable embodiment of the invention for a purpose of exemplification in detail, it will be appreciated that various modifications, changes or additions thereto may be made without departing from the spirit and scope thereof. Accordingly, only such limitations are to be imposed on the invention as are indicated in the appended claims.

What is claimed is:

1. A sprocket buffer of a chain gearing mechanism comprising:

an elastic band formed as an upper surface of the sprocket buffer;

a pin portion formed as a bottom part of the sprocket buffer, the pin portion extending a predetermined length from the elastic band and having an exterior surface; and a pressure portion formed along a bottom of the exterior surface of the pin portion, wherein the pressure portion extends radially outward from a body portion of the pin portion and forms a discontinuity in the exterior surface of the pin portion.

2. The sprocket buffer of claim 1, wherein the elastic band and the pin portion are formed integrally.

3. The sprocket buffer of claim 1, wherein the pin portion comprises a body having a smaller diameter than the pressure portion formed integrally with a lower part of the body.

4. The sprocket buffer of claim 1, wherein the elastic band is crescent in shape.

5. The sprocket buffer of a chain gearing mechanism comprising:

a sprocket wheel having tooth formations formed thereon;

a chain having a plurality of chain roller members, the chain roller members making contact with the sprocket wheel between the tooth formations;

a coupling hole formed in and between at least one tooth formation of the sprocket;

an elastic band member adhearable between at least one tooth formation of the sprocket, the elastic band being designed to reduce noise or vibration during rotation of the sprocket wheel;

a pin portion member formed as a bottom portion of the elastic band, the pin portion member being insertable into the coupling hole and forms a predetermined clearance between an interior surface of the coupling hole and an exterior surface of the pin portion member along at least a length of the pin portion member where the pin portion member and said elastic band member abut; and a pressure portion defined at a bottom end portion of said pin portion, wherein the pressure portion extends radially outward from a body portion of the pin portion and forms a discontinuity in the exterior surface of the pin portion, whereby the pressure portion retainably holds the pin portion in the coupling hole.

6. The sprocket buffer of claim 5, wherein the elastic band member and the pin portion member are formed integrally.

7. The sprocket buffer of claim 5, wherein the pin portion member comprises a body having a smaller diameter than the coupling hole and the pressure portion is of a same diameter as a diameter of the coupling hole.

8. The sprocket buffer of claim 5, wherein the elastic band member is crescent in shape.

9. The sprocket buffer of claim 5, wherein the pin portion member upon contact of a chain roller member with the elastic band member shears from a center-line position of the pin portion member, whereby the elastic band member is allowably shifted in a direction against a driving direction of the sprocket.

* * * * *